Dec. 13, 1966 R. F. PARNOCK ET AL 3,290,968
THREADED ELEMENT INSTALLATION TOOL
Filed March 19, 1965

ROBERT F. PARNOCK
DENNY A. HOGAN
INVENTORS

BY William P. Green
ATTORNEY

United States Patent Office 3,290,968
Patented Dec. 13, 1966

3,290,968
THREADED ELEMENT INSTALLATION TOOL
Robert F. Parnock, Long Beach, and Denny A. Hogan, Garden Grove, Calif., assignors to Newton Insert Co., Los Angeles, Calif., a corporation of California
Filed Mar. 19, 1965, Ser. No. 441,129
17 Claims. (Cl. 81—53)

This invention relates to improved tools for installing threaded elements, such as threaded inserts or studs, in carrier parts. As will appear, the invention is especially concerned with the installation of elements which are of a self tapping character, that is, which form their own mating threads in the carrier part during the installation process.

When a self tapping element is screwed into an initially unthreaded bore or passage, the thread tapping operation necessarily requires the application of a substantial amount of torque to the threaded element by the installing tool. This torque may cause a binding action between the threaded element and tool tending to prevent the tool from being unscrewed from the element after installation, and as a result the tool may upon withdrawal remove the threaded element itself from the carrier part. The tools of the present invention are of a type having an automatic break-away action which inherently releases any binding condition which may have developed, to prevent the discussed unwanted removal of the installed element.

A major object of the invention is to provide a breakaway tool of the discussed type which is very positive in operation, and produces the break-away action in a manner rendering the device permanently reliable in operation. The unit is so constructed that the imposition of an unscrewing, removal torque on the tool automatically retracts a driving portion of the tool away from the threaded element whenever binding occurs, and does so by a simple thread or lead screw structure which cannot be adversely affected or rendered inoperable by any small amount of wear which may occur in that mechanism in use.

A further object of the invention is to provide a device capable of attaining the above discussed results, and which is structurally very simple and inexpensive to manufacture, with a minimum number of parts arranged for very easy assembly into the ultimate overall unit.

Structurally a tool embodying the invention includes two sections which are connected together for rotation in unison, and also for limited relative rotation. A first of these sections has threads which are engageable with the element to be installed, to hold the element during installation. The second section is adapted to apply an axially inward force against the element, preferably against an end surface of the element, in a manner such that when the two sections are turned together they can screw the element into a carrier part. Besides the mentioned thread for holding the element to be installed, the first section also has a second thread which engages a mating thread on the second section of the apparatus to require predetermined relative axial movement of the parts in response to their limited relative rotation. To attain the mentioned breakaway action, one of the two threads of the "first section" of the device is a right hand thread, while the other is a left hand thread, so that when the "first section" is turned in an unscrewing direction relative to the "second section" of the device, this relative rotation acts through the second thread to require axial retracting movement of the second section away from any binding engagement which may have developed with the element being installed. Normally, the thread which is connected to the element being installed is the right hand thread, while the threads which form a connection between the two sections are left hand threads.

The limited unscrewing rotation of the first section relative to the second section may be yieldingly resisted by an appropriate spring. Also, suitable means are provided for limiting the relative axial movement of the sections, desirably by shoulder means which are axially between the two discussed threads on the first section. Further, between these threads there may be provided a bearing surface on the first section which is engageable with the second section to locate it for the desired relative rotation. Preferably, the "second section" is formed of two parts, which may be connected threadedly together, and which may have opposed stop shoulders between which a motion limiting shoulder on the first section is confined.

The above and other features and objects of the invention will be better understood from the following detailed description of the typical embodiments illustrated in the accompanying drawing, in which.

Figure 1:
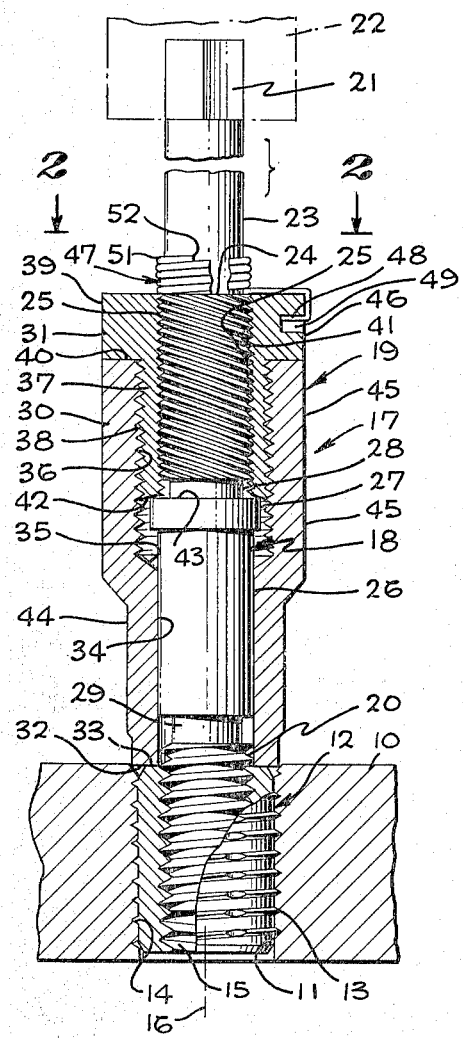
FIG. 1 is an axial section through a tool constructed in accordance with the invention, with certain portions of the tool being shown in elevation.

In FIG. 1, we have illustrated at 10 carrier part having an initially unthreaded bore or passage 11 into which a threaded insert 12 is being installed. Insert 12 has external threads 13 which are self tapping in character, so that they form mating internal threads 14 in bore 11 as insert 12 is screwed into that bore. Threads 13 are also self-locking in character, so that they resist with substantial force any tendency to unscrew the insert from the bore after installation. Internally, insert 12 contains a second set of threads, centered about the same axis 16 as are external threads 13, and ultimately to be engaged with a threaded screw or stud to connect that stud to the carrier part 10 through the medium of the insert.

For installing insert 12 within the carrier part, I provide a tool 17 which is constructed in accordance with the invention. This tool includes a first section or part 18 which takes the form generally of an elongated shaft or rod centered about axis 16, and about which there is mounted a second section 19 of the tool. Section 18 has at its axially inner end a portion on which there is formed an external thread 20 corresponding to the internal thread 15 formed within the insert to be installed. Threads 15 and 20 may be standard threads of the American Standard Series, desirably being of uniform diameter and cross section along the entire length of the threaded end portion of section 18.

At its axially outer end, section 18 may have a drive portion 21 which is of square or other non-circular cross section transversely of axis 16, to be engageable by a chuck 22 of a power actuated driving tool which is designed when energized to turn section 18 about axis 16, and simultaneously advance section 18 along that axis in correspondence with the helical advancement or pitch of threads 13, to screw the insert into the carrier part. Adjacent square portion 21 of section 18, this section may have an externally cylindrical portion 23, terminating at 24. Extending axially inwardly from the location 24, section 18 has an external left hand thread 25 continuing without interruption through several complete turns about axis 16. Thread 25 may typically be a left hand multiple thread, as shown, having a fairly fast lead which is typically four times its pitch.

Axially between threads 20 and 25, section 18 has an elongated cylindrical outer surface 26, centered about axis 16, and an enlarged diameter annular externally cylindrical stop flange or shoulder portion 27, also centered about axis 16. If desired, short reduced diameter portions 28 and 29 may be provided on section 18 at the locations illustrated in FIG. 1.

The second section 19 of the tool is formed of two separately constructed tubular parts 30 and 31. Part 30 has at its axially inner end an annular end surface 32, disposed directly transversely of axis 16, and adapted to abut axially inwardly against transverse end surface 33 of insert 12 to apply inward force thereagainst. The peripheral diameter of annular surface 32 may correspond approximately to the maximum diameter of insert 12, and particularly to the maximum diameter of its external self tapping threads 13. The minor diameter of surface 32 may correspond approximately to the major diameter of threads 20 of the end portion of section 18.

Internally, part 30 contains, at its lower end, a cylindrical inner surface or passage 34, of a diameter corresponding substantially to that of external surface 26 of section 18, and annularly engaging that surface in a manner such that surfaces 26 and 34 function as bearing surfaces rotatably centering part 30 about section 18. At the upper end of surface 34, part 30 may contain a tapered frustro-conical surface 35, and beyond that surface may contain internal threads 36, desirably right hand in character. The second tubular part 31 of the second section 19 of the device has a tubular portion 37 which projects axially into the upper end of part 30, and has on its outer surface external threads 38 engaging internal threads 36 of part 30 to secure these two parts together. At the axially outer or upper end of part 30, part 31 has an increased diameter flange 39, which engages part 30 at the location of two annular transverse surfaces 40. Threads 36 and 38 are tightened together sufficiently tightly to develop enough friction in these threads and in the shoulders 40 to prevent any relative motion between parts 30 and 31 during operation of the apparatus. That is, these parts 30 and 31 function essentially as one integral element after assembly and during an insert installing operation.

Internally, part 31 contains threads 41, which may extend along the entire axial length of part 31, and are centered about axis 16 and are left hand threads corresponding to and meshing with threads 25 of section 18. The engagement between threads 25 and 41 is such as to allow relative motion of these threads during operation of the apparatus, with very little resistance to such threaded or screwing motion of section 18 relative to section 19. This relative threaded movement of sections 18 and 19 is limited by engagement of the transverse ends of flange 27 of section 18 with shoulder 35 in part 30, and with a generally transverse shoulder or surface 42 formed at the inner end of portion 37 of part 31. Desirably, this surface 42 is not directly transverse with respect to axis 16, but rather extends at a slight upward inclination as it advances radially inwardly toward axis 16, so that the upper directly transverse surface 43 on flange 27 of section 18 engages surface 42 only along essentially a single line of contact, at the extreme outermost portion of surface 43. Thus, the friction at this location is a minimum.

Externally, part 30 may have a lower reduced diameter cylindrical outer surface 44, and an upper enlarged diameter external cylindrical surface 45 which is aligned with and of a diameter corresponding to outer surface 46 of part 31.

For resisting left hand or unscrewing rotation of section 18 relative to section 19, there is provided a coil spring 47, having an end 48 which projects into a recess 49 in part 31. In extending from this end, the coil spring first forms a relatively large diameter turn about portion 23 of section 18, at a diameter greater than the outer surface of portion 23, and then reduces in diameter to form several turns of the spring at 51, tending to normally return to a diameter slightly smaller than surface 23, and frictionally gripping that surface. The second end of the spring 47 need not be fixed to any portion of the apparatus, but merely terminates as illustrated at 52 in FIG. 1, so that section 18 will be effective to turn spring 47 in a left hand or unscrewing direction, but can if desired turn relative to spring 47 in a right hand direction.

To now describe a cycle of operation of the tool, assume first of all that the insert 12 is not as yet installed within carrier part 10, and that the passage 11 within the carrier part is initially an unthreaded bore. The first step is to manually screw insert 12 onto the threaded end portion 20 of section 18, with the tool in the FIG. 1 condition, and up to a point at which the insert engages axially outwardly against transverse end surface 32 of part 30. With the insert thus held on the tool, the power applying unit 22 is energized to turn section 18 and simultaneously advance downwardly, so that insert 12 is screwed into the carrier part. During such installing motion of the tool and insert, section 19 and its two tubular parts 30 and 31 are required to turn with section 18 by virtue of the engagement of shoulder 27 of section 18 with surface 42.

When the tool and insert have reached the FIG. 1 fully installed position, the rotation of section 18 in a right hand installing direction is halted, and power unit 22 is reversed to turn section 18 in a left hand or unscrewing direction. If section 19 is sufficiently free to also turn, it will turn with section 18, and the entire tool will be unscrewed from the installed insert 12, leaving the insert within carrier part 10. However, if the installing operation, and particularly the resistance to such installation resulting from the self tapping action of insert 12, has been sufficient to develop a heavy frictional binding engagement between surfaces 32 and 33 of part 30 and the insert, this frictional engagement will cause the insert to hold part 30 against unscrewing rotation with section 18. With part 30 and its connected part 31 thus held against rotation, the left hand unscrewing turning movement of section 18 will act through the left hand threads at 25 and 41 to cause upward or axially outward retraction of section 19 relative to section 18 and the insert. Thus, the limited relative rotation between sections 18 and 19 in the event of binding acts to automatically cause axial retracting movement of section 19 away from its tight engagement with the insert. In this way, section 19 is released from its binding engagement and can be easily removed from the insert with section 18. The discussed limited relative rotary motion of section 18 relative to section 19, at the instant of break-away, is resisted by spring 47, which immediately returns section 19 to its FIG. 1 position relative to section 18 as soon as the parts have moved sufficiently away from the insert and carrier part. The break-away action is illustrated in FIG. 3, in which section 18 has been turned slightly relative to section 19, so that the left hand threads between the two sections have elevated bottom surface 32 of part 30 away from engagement with the insert.

Figure 3:
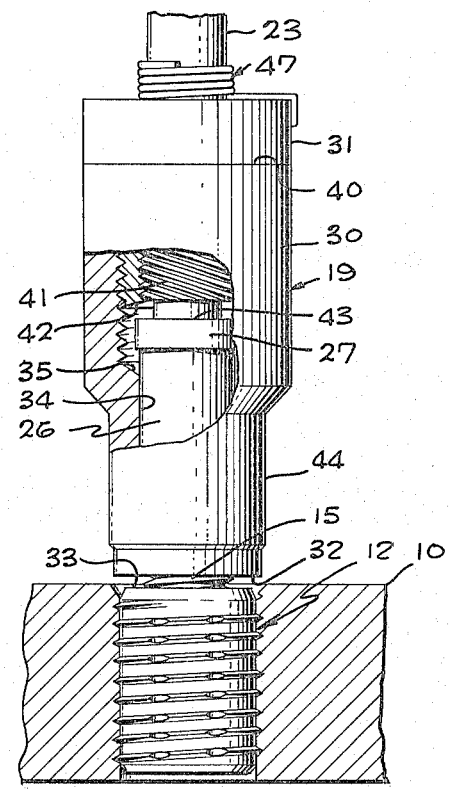
FIG. 3 is a view similar to FIG. 1, but showing the tool as it is being unscrewed from an installed insert.
Figure 4:
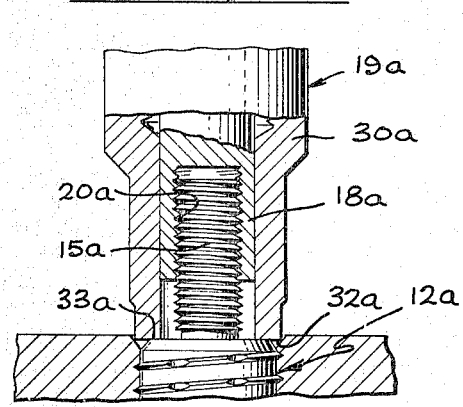
FIG. 4 is a view similar to FIG. 1, but showing a variational form of the invention.
Figure 2:
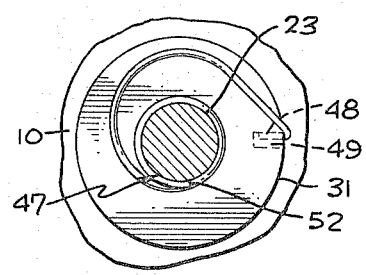
FIG. 2 is a section taken on line 2—2 of FIG. 1.

FIG. 4 shows a variational form of the invention which may be considered as identical with that of FIGS. 1 to 3 except that the tool of FIG. 4 has been altered to install a stud type insert 12a, having an upwardly projecting portion with external threads 15a rather than the internal threads 15 of FIG. 1. To engage threads 15a, section 18a is provided with internal threads 20a, instead of the external threads 20 of FIG. 1. The lower end surface 32a of part 30a may engage against a transverse shoulder surface 33a of element 12a, to drive the element 12a into a carrier part. The installing and break-away operations are performed in the same manner discussed in connection with the first form of the invention, with a left hand threaded connection corresponding to that discussed hereinabove acting to retract section 19a axially upwardly away from shoulder 33a in response to unscrewing rotation of section 18a relative to section 19a.

If the insert being installed has left hand threads, so that the threads 20 of FIG. 1 or 20a of FIG. 4 are left hand threads, then the retracting or break-away threaded connection 25–41 should of course be a right handed thread joint, to attain the same ultimate result as has been discussed in the particular forms of the invention described above.

We claim:

1. A tool for installing a threaded element in a carrier part, comprising a first section adapted to be turned about an axis and having a first set of threads for engaging and holding said element, a second section mounted to rotate about said axis with and relative to said first section and adapted to apply axially inward force to said element when the latter is held by said first set of threads so that said element may be screwed by said sections into said carrier part, and a second set of threads on said first section and mating threads on said second section requiring relative axial movement of said sections upon said relative rotation thereof, one of said sets of threads of said first section being right hand threads and the other of said sets being left hand, whereby rotation of said first section relative to said second section in a direction to unscrew said first set of threads from said element will act through said second set of threads to retract said second section axially from said element.

2. A tool for installing a threaded element in a carrier part, comprising a first section adapted to be turned about an axis and having a first set of threads for engaging and holding said element, a second section mounted to rotate about said axis with and relative to said first section and adapted to apply axially inward force to said element when the latter is held by said first set of threads so that said element may be screwed by said sections into said carrier part, a second set of threads on said first section and mating threads on said second section requiring relative axial movement of said sections upon said relative rotation thereof, one of said sets of threads of said first section being right hand threads and the other of said sets being left hand, whereby rotation of said first section relative to said second section in a direction to unscrew said first set of threads from said element will act through said second set of threads to retract said second section axially from said element, and a spring yieldingly resisting said rotation of said first section relative to said second section in said unscrewing direction.

3. A tool as recited in claim 2, in which said spring has a first portion essentially fixed to said second section and has a second portion forming a coil about and frictionally engaging said first section.

4. A tool for installing a threaded element in a carrier part, comprising a first section adapted to be turned about an axis and having a first set of threads for engaging and holding said element, a second section mounted to rotate about said axis with and relative to said first section and adapted to apply axially inward force to said element when the latter is held by said first set of threads so that said element may be screwed by said sections into said carrier part, and a second set of threads on said first section and mating threads on said second section requiring relative axial movement of said sections upon said relative rotation thereof, one of said sets of threads of said first section being right hand threads and the other of said sets being left hand, whereby rotation of said first section relative to said second section in a direction to unscrew said first set of threads from said element will act through said second set of threads to retract said second section axially from said element, said second section being tubular and disposed about said first section and having an unthreaded internal bearing surface engaging an unthreaded external bearing surface on said first section at a location axially between said two sets of threads.

5. A tool for installing a threaded element in a carrier part, comprising a first section having at one end thereof a tool engaging drive portion adapted to be engaged and turned about an axis by a driving tool, said first section having at an opposite end thereof a first set of threads for engaging and holding said element, a second section mounted to rotate about said axis with and relative to said first section and adapted to apply axially inward force to said element when the latter is held by said first set of threads so that said element may be screwed by said sections into said carrier part, and a second set of threads on said first section and mating threads on said second section requiring relative axial movement of said sections upon said relative rotation thereof, one of said sets of threads of said first section being right hand threads and the other of said sets being left hand, whereby rotation of said first section relative to said second section in a direction to unscrew said first set of threads from said element will act through said second set of threads to retract said second section axially from said element.

6. A tool for installing a threaded element in a carrier part, comprising a first section adapted to be turned about an axis and having a first set of threads for engaging and holding said element, a second section mounted to rotate about said axis with and relative to said first section and adapted to apply axially inward force to said element when the latter is held by said first set of threads so that said element may be screwed by said sections into said carrier part, a second set of threads on said first section and mating threads on said second section requiring relative axial movement of said sections upon said relative rotation thereof, one of said sets of threads of said first section being right hand threads and the other of said sets being left hand, whereby rotation of said first section relative to said second section in a direction to unscrew said first set of threads from said element will act through said second set of threads to retract said second section axially from said element, and interengageable shoulders on said two sections for limiting relative axial movement of said sections.

7. A tool for installing a threaded element in a carrier part, comprising a first section adapted to be turned about an axis and having a first set of threads for engaging and holding said element, a second section mounted to rotate about said axis with and relative to said first section and adapted to apply axially inward force to said element when the latter is held by said first set of threads so that said element may be screwed by said sections into said carrier part, a second set of threads on said first section and mating threads on said second section requiring relative axial movement of said sections upon said relative rotation thereof, one of said sets of threads of said first section being right hand threads and the other of said sets being left hand, whereby rotation of said first section relative to said second section in a direction to unscrew said first set of threads from said element will act through said second set of threads to retract said second section axially from said element, and stop shoulder means on said first section axially between said two sets of threads for limiting relative axial movement of said sections.

8. A tool as recited in claim 7, in which said threads of said second set are external, said stop shoulder means including a radially outwardly projecting ring on said first section engageable axially against said second section.

9. A tool for installing a threaded element in a carrier part, comprising a first section adapted to be turned about an axis and having a first set of threads for engaging and holding said element, a second section mounted to rotate about said axis with and relative to said first section and adapted to apply axially inward force to said element when the latter is held by said first set of threads so that said element may be screwed by said sections into said carrier part, and a second set of threads on said first section and mating threads on said second section requiring relative axial movement of said sections upon said relative rotation thereof, one of said sets of threads of said first section being right hand threads and the other of said sets being left hand, whereby rotation of said first section relative to said second section in a direction to unscrew said first set of threads from said element will act through said second set of threads to retract said second section axially from said element, said second section including two separately formed parts connected together and both disposed about said first section.

10. A tool for installing a threaded element in a carrier part, comprising a first section adapted to be turned about an axis and having a first set of threads for engaging and holding said element, a second section mounted to rotate about said axis with and relative to said first section and adapted to apply axially inward force to said element when the latter is held by said first set of threads so that said element may be screwed by said sections into said carrier part, a second set of threads on said first section engaging mating threads on said second section and requiring relative axial movement of said sections upon said relative rotation thereof, one of said sets of threads of said first section being right hand threads and the other of said sets being left hand, whereby rotation of said first section relative to said second section in a direction to unscrew said first set of threads from said element will act through said second set of threads to retract said second section axially from said element, said second section including two separately formed parts connected together and both disposed about said first section, and stop shoulder means on said first section axially between portions of said two parts of the second section for limiting relative axial movement of the sections.

11. A tool for installing a threaded element in a carrier part, comprising a first section adapted to be turned about an axis and having a first set of threads for engaging and holding said element, a second section mounted to rotate about said axis with and relative to said first section and adapted to apply axially inward force to said element when the latter is held by said first set of threads so that said element may be screwed by said sections into said carrier part, and a second set of threads on said first section and mating threads on said second section requiring relative axial movement of said sections upon said relative rotation thereof, one of said sets of threads of said first section being right hand threads and the other of said sets being left hand, whereby rotation of said first section relative to said second section in a direction to unscrew said first set of threads from said element will act through said second set of threads to retract said second section axially from said element, said second section including two separately formed parts connected together by additional threads disposed about said second set of threads.

12. A tool as recited in claim 9, in which one of said parts contains said threads which engage said second set of threads, the other of said parts having an internal cylindrical bearing surface engaging a bearing surface on said first section.

13. A tool for installing a threaded element in a carrier part, comprising an elongated first section having at one end thereof a non-circular tool engaging drive portion adapted to be engaged and turned about an axis by a tool, said first section having at an opposite end thereof a set of right hand threads adapted to engage and hold said element, a second section disposed about said first section and mounted to rotate about said axis with and relative to the first section, said second section including a first tubular part about said first section and a second tubular part connected to and axially outwardly of said first part, means forming a shoulder at an axially inner end of said first part for engaging axially inwardly against said element, a set of external left hand threads on said first section and mating internal left hand threads in said second tubular part of the second section requiring relative axial movement of the sections upon relative rotary movement thereof, whereby rotation of said first section in a direction to unscrew said right hand threads from said element will act through said left hand threads to retract said second section axially from said element.

14. A tool as recited in claim 13, in which said first section has an external cylindrical bearing surface axially between said right hand and left hand threads and engaging an internal cylindrical bearing surface in said first tubular part of the second section.

15. A tool as recited in claim 13, in which said first section has a radially outwardly projecting shoulder axially between said right hand and left hand threads and confined between opposed shoulders on said two tubular parts respectively to limit relative axial movement of the sections.

16. A tool as recited in claim 13, including a spring having an end fixed to said second tubular part and having a coiled portion surrounding and frictionally engaging said first section and yieldingly resisting left hand turning of said first section relative to said second section.

17. A tool as recited in claim 13, in which said first section has an external cylindrical bearing surface axially between said right hand and left hand threads and engaging an internal cylindrical bearing surface in said first tubular part of the second section, said first section having a radially outwardly projecting shoulder axially between said left hand threads and said external cylindrical surface and confined between opposed shoulders on said two tubular parts respectively to limit relative axial movement of the sections, said tool including a spring having an end fixed to said second tubular part and having a coiled portion surrounding and frictionally engaging said first section and yieldingly resisting left hand turning of said first section relative to said second section.

References Cited by the Examiner

UNITED STATES PATENTS

| | | | |
|---|---|---|---|
| 2,719,445 | 10/1955 | Giebler | 81—53 |
| 2,743,639 | 5/1956 | Lynch | 81—53 |
| 2,798,392 | 7/1957 | Randolph | 81—53 |
| 3,152,495 | 10/1764 | Neuschotz | 81—53 |

WILLIAM FELDMAN, *Primary Examiner.*

JAMES L. JONES, JR., *Examiner.*